Jan. 17, 1928.
C. CLAUS
1,656,508
SELF ALIGNING BEARING STRUCTURE
Filed May 19, 1926
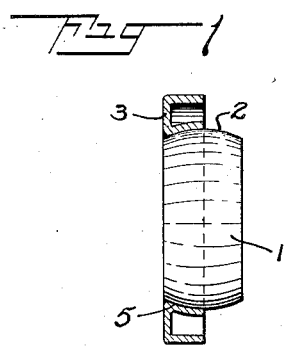
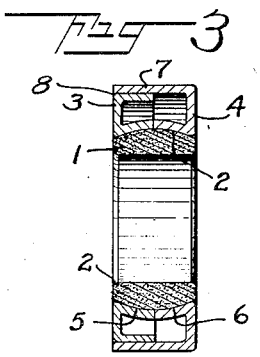
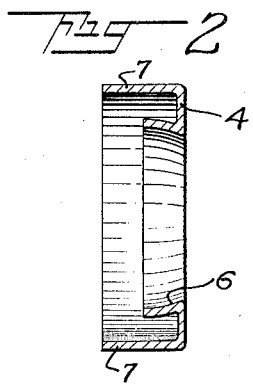
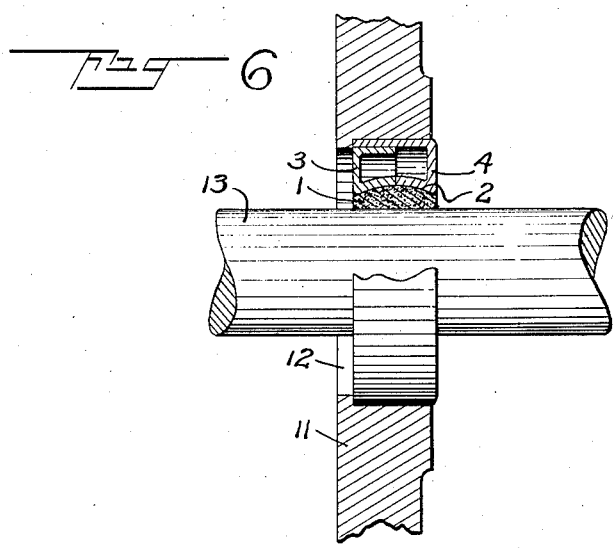
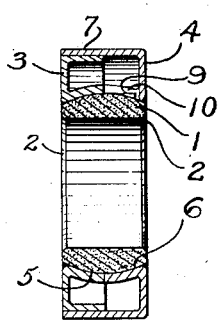
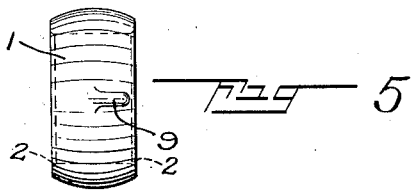
INVENTOR.
Carl Claus.
BY Willis Fowler
ATTORNEYS.

Patented Jan. 17, 1928.

1,656,508

UNITED STATES PATENT OFFICE.

CARL CLAUS, OF PLAINFIELD, NEW JERSEY, ASSIGNOR TO BOUND BROOK OIL-LESS BEARING COMPANY, OF BOUND BROOK, NEW JERSEY, A CORPORATION OF NEW JERSEY.

SELF-ALIGNING BEARING STRUCTURE.

Application filed May 19, 1926. Serial No. 110,119.

My invention relates in general to self-aligning bearings and one of the objects of the improvements is to provide a simple form of bearing structure which can be easily made from pressed metal at a low cost of manufacture. Still another object in view is the production of a self-aligning bearing structure which may be quickly assembled without the tool or die work required by some structures, and may likewise be easily taken apart for repairs or replacement of any part.

There are other features of the invention which will appear hereinafter from the more detailed description given in connection with the drawings.

I have illustrated a type of my invention in the accompanying drawings, wherein;

Fig. 1, is a sectional view of one of the two annular parts forming the housing, the plane of the section containing the axis of the annulus.

Fig. 2, is a similar view to that shown in Fig. 1, of the other one or mate of the annular housing members.

Fig. 3, is a view of a section of the two annular parts when assembled after the bearing ring-shaped member has been seated in one of said parts, the section being taken on a plane containing the axis of the bearing structure.

Fig. 4, is a similar view of the structure shown in Fig. 3, but with a slight modification.

Fig. 5, shows an elevation of the bearing-member detached from the housing shown in Fig. 4.

Fig. 6, shows the bearing structure mounted in a supporting frame or hanger, with a shaft journaled in the bearing-member and the structure held in place by a suitable retaining ring, part of the view being shown in vertical central section and parts in elevation.

Referring to the drawings, 1 is a bearing-member of tubular form, with a cylindrical bore and a rounded exterior surface 2. The convexity of the surface 2, is spherical the curvature of which is struck from the axis of the member 1. The housing for the bearing-member comprises two parts or annular channel members 3 and 4, one being an inner part and the other an outer part. The inner part 3, is substantially U-shaped in cross section and has its interior formed with a transversely curved surface 5, which conforms to the curvature of the exterior 2, of the bearing-member and provides half of the seat for the same. The outer part 4, is substantially L-shaped in cross-section, with its interior provided with a curved surface 6, likewise conforming to the surface 2, of the bearing-member and forming the other half of the seat for said member. These two channel or hollow parts are placed together with the mouths of the channels or troughs facing each other so as to form a closed interior hollow place or chamber and the outer part 4, is made slightly deeper than the inner part 3, and the outer limb of part 4, is extended at 7, a distance equal to the width of part 3, so that such extended limb overlaps the outer limb of part 3, which telescopes therewith, as shown in the drawings. These parts fit snugly within each other so that when sprung together they will retain their telescoped relation and keep the housing closed around the bearing-member 1, which is put in place in the housing-seat by first being inserted in one of the parts and then bringing the other part up to it and closing them on each other.

The extended portion 7, of the outer housing section 4, covers the exterior peripheral surface of the inner section 3, and encases the housing so as to make a unit. While the two sections 4 and 3, are sprung together with a tight fit without liability of moving outwardly from each other and causing them to separate, nevertheless the precaution may be taken of having a small fin 8, formed around the mouth of the extended rim 7, of section 4, which fin may be bent inwardly when the two sections are put together, in order to hold the section 3, in place.

The housing sections 3 and 4, may be stamped from steel or other suitable metal, in finished form and to exact size ready to be assembled with the bearing-member in its seat. These hollow members in addition to being made at a low cost, also provide a desirable lightness in weight of the housing.

In the modification shown in Figs. 4 and 5, the bearing-member 1, is held against rotation on its axis in its seat by means of a lug and slot arranged between it and the housing. The lug 9, on the exterior of the bearing-member, extends into the slot 10, in the interior of the housing section or part 4, to form the locking means, as shown in said Figs. 4 and 5.

The bearing-member 1, is formed from compressed powdered materials, such as graphite, copper, lead and tin, or copper, tin and zinc, in suitable proportions, which after formation into a consolidated body is heat treated and then sized.

In making the self-lubricating bearing-member which may be soaked in lubricating oil to fill its pores, the apparatus disclosed by me in my pending application for patent filed October 26, 1923, Serial No. 671,032, may be used, and the product therefrom will be found applicable to the present invention.

In Figure 6, I show the completed bearing structure as mounted in operative position in a frame or hanger 11, by being driven in the recess 12, formed in such frame, so that it is securely held therein, a shaft 13 being placed in same.

My improved device may be used in place of ordinary ball-bearings in cases where such expensive bearings have been heretofore employed because of their ability to give or yield slightly when the shaft tilts or rocks out of place. In such use, my improved bearing structure will be found highly efficient in its operation as a self aligning device.

Having thus described my invention, what I claim and desire to secure by Letters Patent is:—

1. In a self-aligning bearing structure, a tubular bearing-member in the bore of which a shaft may be mounted and having the exterior thereof spherically curved about the center of the bearing structure whereby the bearing-member may rock in its seat on a transverse axis, a housing comprising a pair of angular pressed metal trough-shaped members juxtaposed with the mouths of their troughs opening into each other and with the inner walls of the troughs arranged with their free edges in abutting relation to form a seat for said bearing-member, the outer faces of said abutting walls being spherically curved about the center of the bearing structure to conform to the engaging exterior surface of said bearing-member, and the outer walls of said housing members being constructed and arranged to telescope with each other.

2. In a self-aligning bearing structure, an annular bearing-member having a cylindrical bore and a spherically convex periphery, and a housing for said bearing-member comprising a pair of sheet-metal rings U-shaped in cross-section with the inner limb of each formed arcuate so as to form together a spherically concave seat for the convex periphery of said bearing-member, the ends of said inner limbs being placed in abutting relation, the outer limbs arranged to telescope.

In testimony whereof, I have hereunto set my hand.

CARL CLAUS.